(12) United States Patent
Tanaka

(10) Patent No.: US 8,636,396 B2
(45) Date of Patent: Jan. 28, 2014

(54) VEHICLE BODY FRONT STRUCTURE

(75) Inventor: Hirofumi Tanaka, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 0 days.

(21) Appl. No.: 13/537,191

(22) Filed: Jun. 29, 2012

(65) Prior Publication Data

US 2013/0021814 A1     Jan. 24, 2013

(30) Foreign Application Priority Data

Jul. 20, 2011 (JP) ................................ 2011-159088

(51) Int. Cl.
*B60Q 1/00* (2006.01)

(52) U.S. Cl.
USPC ................... 362/496; 180/69.2; 296/187.01

(58) Field of Classification Search
USPC ................... 362/496; 180/69.2; 296/187.01
See application file for complete search history.

(56) References Cited

U.S. PATENT DOCUMENTS

| | | | | |
|---|---|---|---|---|
| 4,707,020 A | * | 11/1987 | Enokida et al. ............... | 296/191 |
| 6,450,676 B2 | * | 9/2002 | Maeda et al. ................ | 362/549 |
| 6,793,275 B1 | * | 9/2004 | Chernoff et al. ......... | 296/193.11 |
| 2002/0011365 A1 | * | 1/2002 | Sasaki et al. ................ | 180/69.2 |
| 2006/0260854 A1 | * | 11/2006 | Chernoff et al. ............. | 180/69.2 |
| 2007/0074919 A1 | * | 4/2007 | Hirata .......................... | 180/69.2 |

FOREIGN PATENT DOCUMENTS

| | | |
|---|---|---|
| JP | 07-328864 A | 12/1995 |
| JP | 07-329631 A | 12/1995 |
| JP | 2008-013166 A | 1/2008 |

OTHER PUBLICATIONS

Japanese Office Action dated Jun. 19, 2013, issued in corresponding Japanese Patent Application No. 2011-159088.

* cited by examiner

*Primary Examiner* — Mary Ellen Bowman

(74) *Attorney, Agent, or Firm* — Westerman, Hattori, Daniels & Adrian, LLP

(57) ABSTRACT

In a vehicle body front structure, a positioning bracket including a hood-mounting reference, a headlight-mounting reference, and a front-bumper-mounting reference are fixed to a front bulkhead. A hood, a headlight, and an upper beam of a front bumper grille are positioned with respect to the hood-mounting reference, the headlight-mounting reference, and the front-bumper-mounting reference, respectively, of the positioning bracket and are fixed to a body of a motor vehicle.

8 Claims, 11 Drawing Sheets

VEHICLE BODY FRONT STRUCTURE

CROSS REFERENCES TO RELATED APPLICATIONS

The present application claims priority under 35 U.S.C. §119 to Japanese Patent Application No. 2011-159088, filed Jul. 20, 2011, entitled "Vehicle Body Front Structure." The contents of this application are incorporated herein by reference in their entirety.

TECHNICAL FIELD

The present application relates to a vehicle body front structure in which at least a hood, headlights, and a front bumper are mounted on a front portion of a body of a motor vehicle.

BACKGROUND

Japanese Unexamined Patent Application Publication No. 7-328864 discloses the following structure. A panel-positioning jig having a coaxial locating pin is attached to an upper support of a radiator core. The coaxial locating pin is set to a first position, where a hood is positioned. Subsequently, the coaxial locating pin is moved to a second position, where a fender is positioned.

Japanese Unexamined Patent Application Publication No. 7-329631 discloses the following structure. An upper clip provided at the bottom of each of headlights is made to engage with a lower clip provided at the top of a fascia of a front bumper, whereby the size of gaps between the front bumper and the headlights are made uniform.

In the structure disclosed by Japanese Unexamined Patent Application Publication No. 7-328864, the coaxial locating pin is movably provided on the panel-positioning jig. Therefore, the position accuracy of the coaxial locating pin relative to the panel-positioning jig may be reduced. Consequently, the position accuracy of the hood and the fender that are positioned with the coaxial locating pin may also be affected.

In the structure disclosed by Japanese Unexamined Patent Application Publication No. 7-329631, the headlights and the front bumper are positioned relative to each other, whereby the size of the gaps produced therebetween are made uniform. However, the headlights and the front bumper are not positioned relative to the body. Therefore, the size of the gaps produced between the headlights or the front bumper and a hood provided adjacent thereto may be nonuniform, deteriorating the beauty of appearance.

SUMMARY

In light of the above, it is desirable that a hood, headlights, and a front bumper that are provided adjacent to one another be accurately fixed to individual positions such that the size of gaps produced therebetween become uniform.

According to an aspect of the embodiment, there is provided a vehicle body front structure including at least a hood, a headlight, and a front bumper each mounted on a front portion of a body of a vehicle. The structure includes a front bulkhead and a positioning bracket fixed to the front bulkhead and including a hood-mounting reference, a headlight-mounting reference, and a front-bumper-mounting reference. The hood, the headlight, and the front bumper are positioned for fixing with respect to the hood-mounting reference, the headlight-mounting reference, and the front-bumper-mounting reference, respectively. Therefore, the size of gaps produced at parts where the hood, the headlights, and the front bumper meet are controlled accurately. Consequently, the beauty of appearance is improved.

In the above vehicle body front structure, the hood-mounting reference, the headlight-mounting reference, and the front-bumper-mounting reference are preferably arranged to form a virtual triangle defined on the positioning bracket. In such a case, the size of the gaps produced between the hood, the headlights, and the front bumper are controlled more accurately. Consequently, the beauty of appearance is further improved.

In the above vehicle body front structure, the positioning bracket may further include a headlight-fastening portion at a position adjacent to the headlight-mounting reference, and a front-bumper-fastening portion at a position adjacent to the front-bumper-mounting reference. In such a case, the headlights and the front bumper that are positioned with respect to the headlight-mounting references and the front-bumper-mounting reference, respectively, are fastened to the positioning brackets while a sufficient level of accuracy in positioning the headlights and the front bumper is maintained.

According to another aspect of the embodiment, there is provided a vehicle body front structure including at least a hood, headlights, and a front bumper each mounted on a front portion of a body of a vehicle. The structure comprises a front bulkhead and a pair of right and left positioning brackets fixed to the front bulkhead and each including a hood-mounting reference, a headlight-mounting reference, and a front-bumper-mounting reference. The hood, each of the headlights, and the front bumper are positioned for fixing with respect to the hood-mounting reference, the headlight-mounting reference, and the front-bumper-mounting reference, respectively. The front bulkhead includes right and left side members, and the right and left positioning brackets are each fixed at an upper portion and a lower portion thereof to the right and left side members, respectively. The front bumper includes an upper beam, respective ends of the upper beam in a body width direction being positioned with respect to the front-bumper-mounting reference and being fastened at the front-bumper-fastening portion. In such a case, the weight of the front bumper is assuredly transmitted to the right and left side members of the front bulkhead via the pair of right and left positioning brackets. Thus, the right and left ends of the front bumper are prevented from bending downward under a gravitational force.

The above vehicle body front structure may further include a pair of right and left connecting members with which the upper beam and an upper member included in the front bulkhead are connected to each other in a body anterior-posterior direction, and a horn bracket with which the pair of right and left connecting members are connected to each other in the body width direction. In such a case, the strength of the front bumper supported by the front bulkhead is further increased.

For example, the front bumper according to the above aspect of the embodiment includes, but not limited to, the front bumper grille 12 according to the below-described embodiment. The headlight-fastening portion according to the above aspect of the embodiment includes, but not limited to, the headlight-fixing hole 15d according to the below-described embodiment. The headlight-mounting reference according to the above aspect of the embodiment includes, but not limited to, the headlight-positioning hole 15e according to the below-described embodiment. The hood-mounting reference according to the above aspect of the embodiment includes, but not limited to, the hood-positioning hole 15f according to the below-described embodiment. The front-bumper-mounting reference according to the above aspect of the embodiment includes, but not limited to, the upper-beam-positioning pin 15g according to the below-described embodiment. The front-bumper-fastening portion according to the above aspect of the embodiment includes, but not limited to, the upper-beam-fixing hole 15h according to the below-described embodiment.

BRIEF DESCRIPTION OF THE DRAWINGS

The advantages of the disclosure will become apparent in the following description taken in conjunction with the drawings, in which.

DETAILED DESCRIPTION

An embodiment of the present application will now be described with reference to FIGS. 1 to 11.

Figure 1:
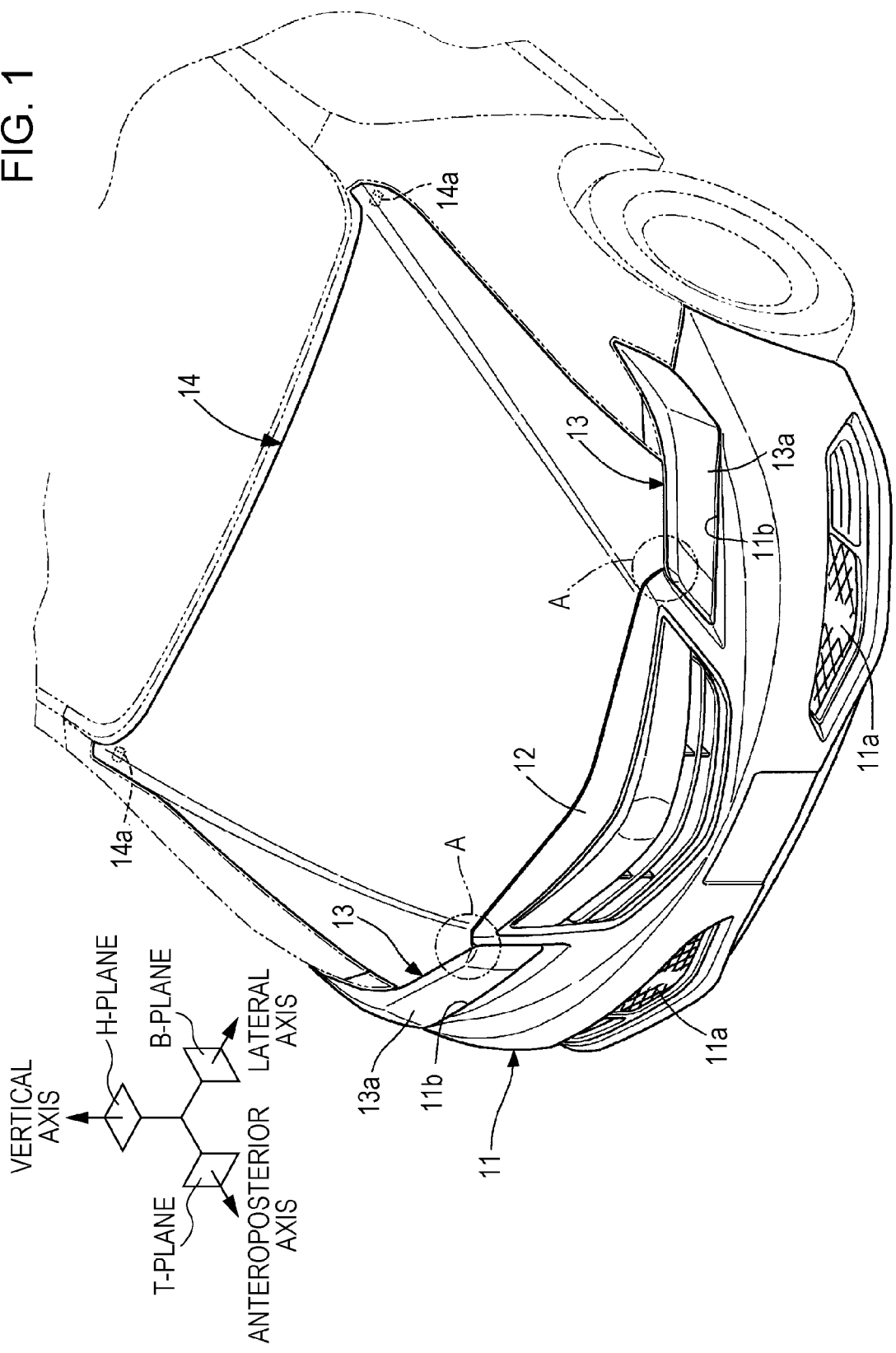
FIG. 1 is a perspective view illustrating a front portion of a body of a motor vehicle.

Herein, the anterior-posterior direction, the lateral direction (body width direction), and the vertical direction are defined with respect to the occupant sitting on the driver's seat of a motor vehicle. Furthermore, a T-plane, a B-plane, and an H-plane referred to herein are defined as follows. As illustrated in FIG. 1, the T-plane is orthogonal to the anterior-posterior axis and corresponds to, for example, the front or rear face of the body of the motor vehicle. The B-plane is orthogonal to the lateral axis and corresponds to, for example, the left or right side face of the body of the motor vehicle. The H-plane is orthogonal to the vertical axis and corresponds to, for example, the ceiling or floor surface of the body of the motor vehicle. Note that the T-plane includes planes at angles smaller than 45 degrees with respect to a plane that is exactly orthogonal to the anterior-posterior axis, the B-plane includes planes at angles smaller than 45 degrees with respect to a plane that is exactly orthogonal to the lateral axis, and the H-plane includes planes at angles smaller than 45 degrees with respect to a plane that is exactly orthogonal to the vertical axis.

Figure 2:
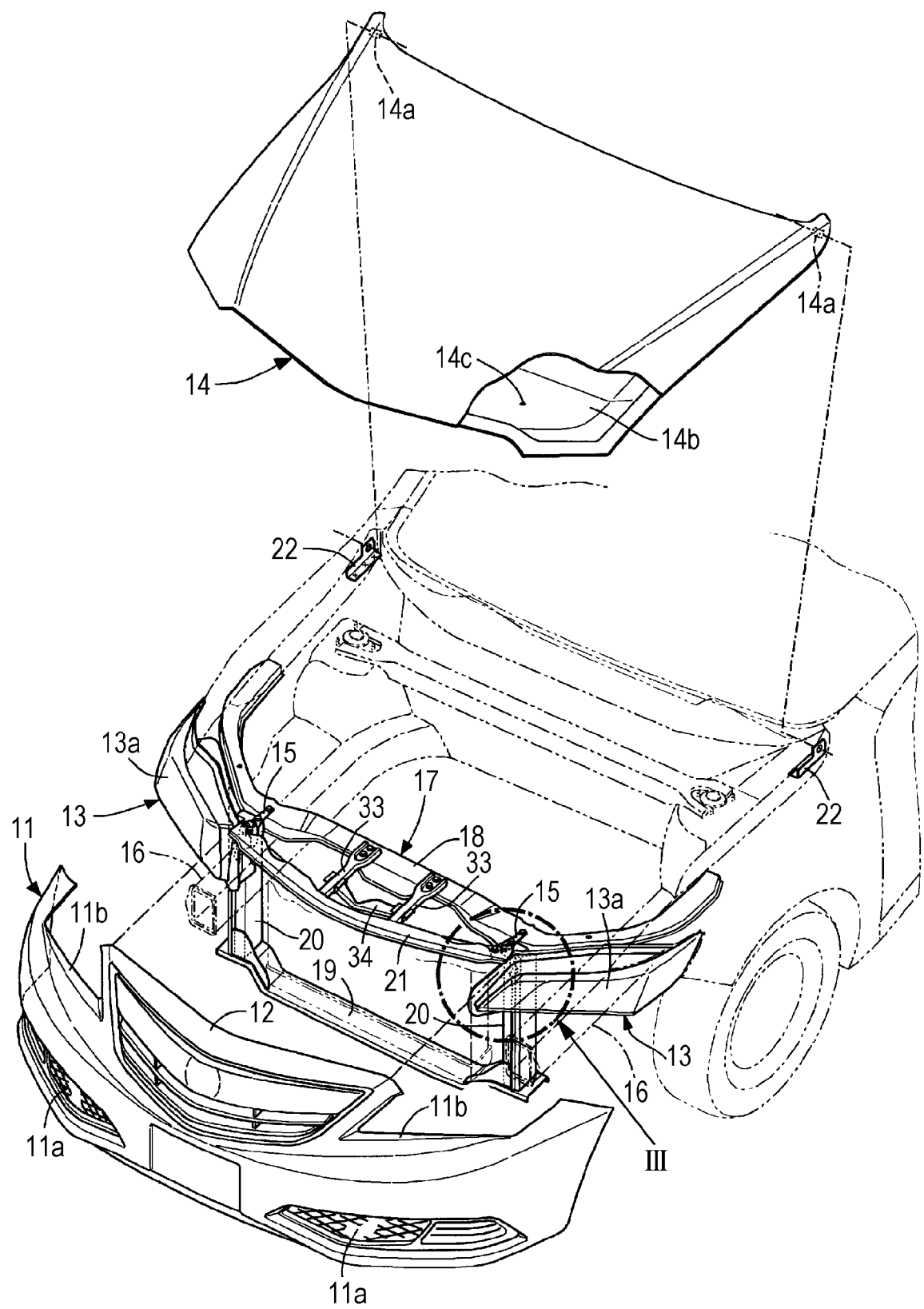
FIG. 2 is an exploded perspective view illustrating the front portion of the body of the motor vehicle.
Figure 3:
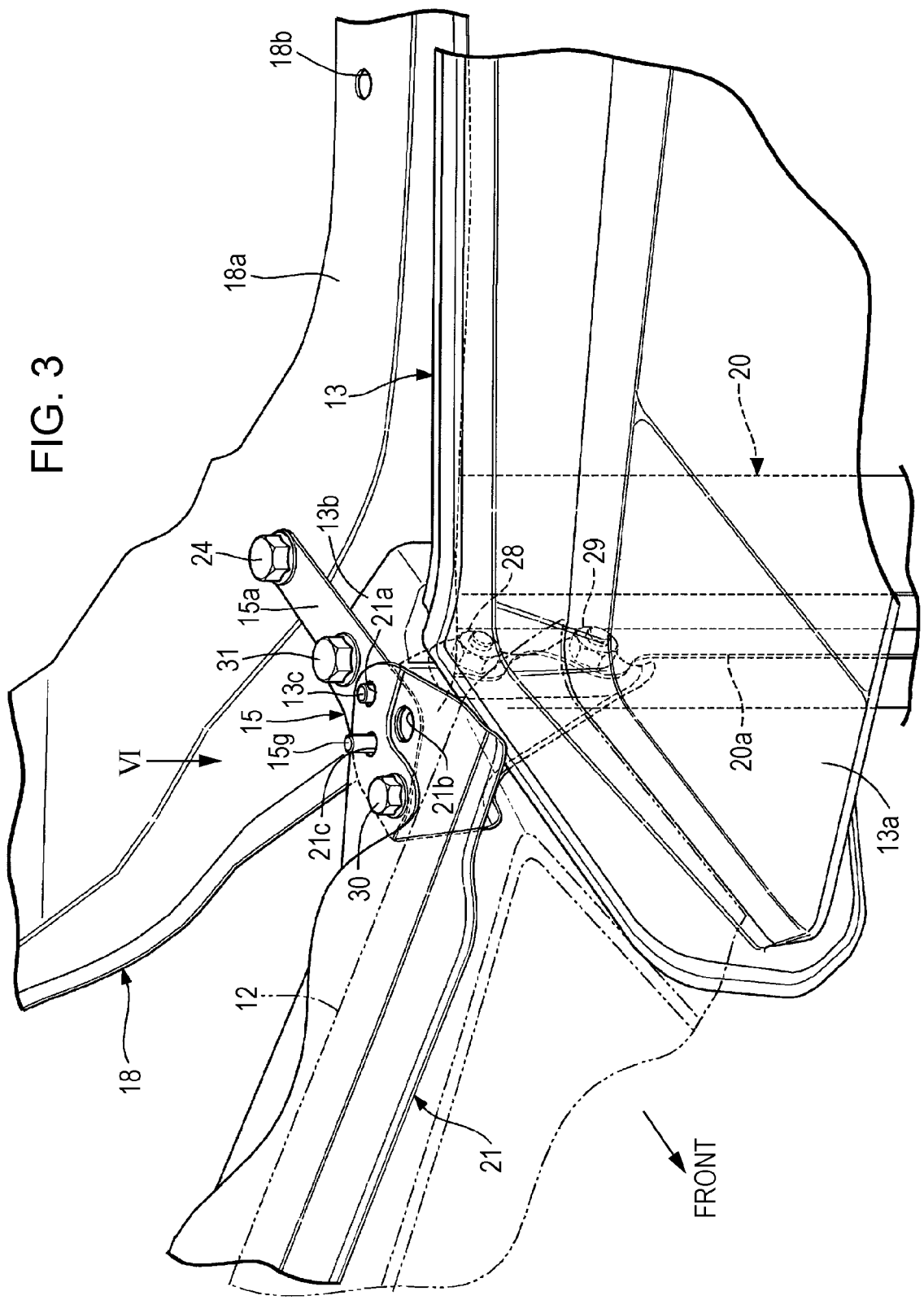
FIG. 3 is an enlarged view of part III illustrated in FIG. 2.
Figure 4:
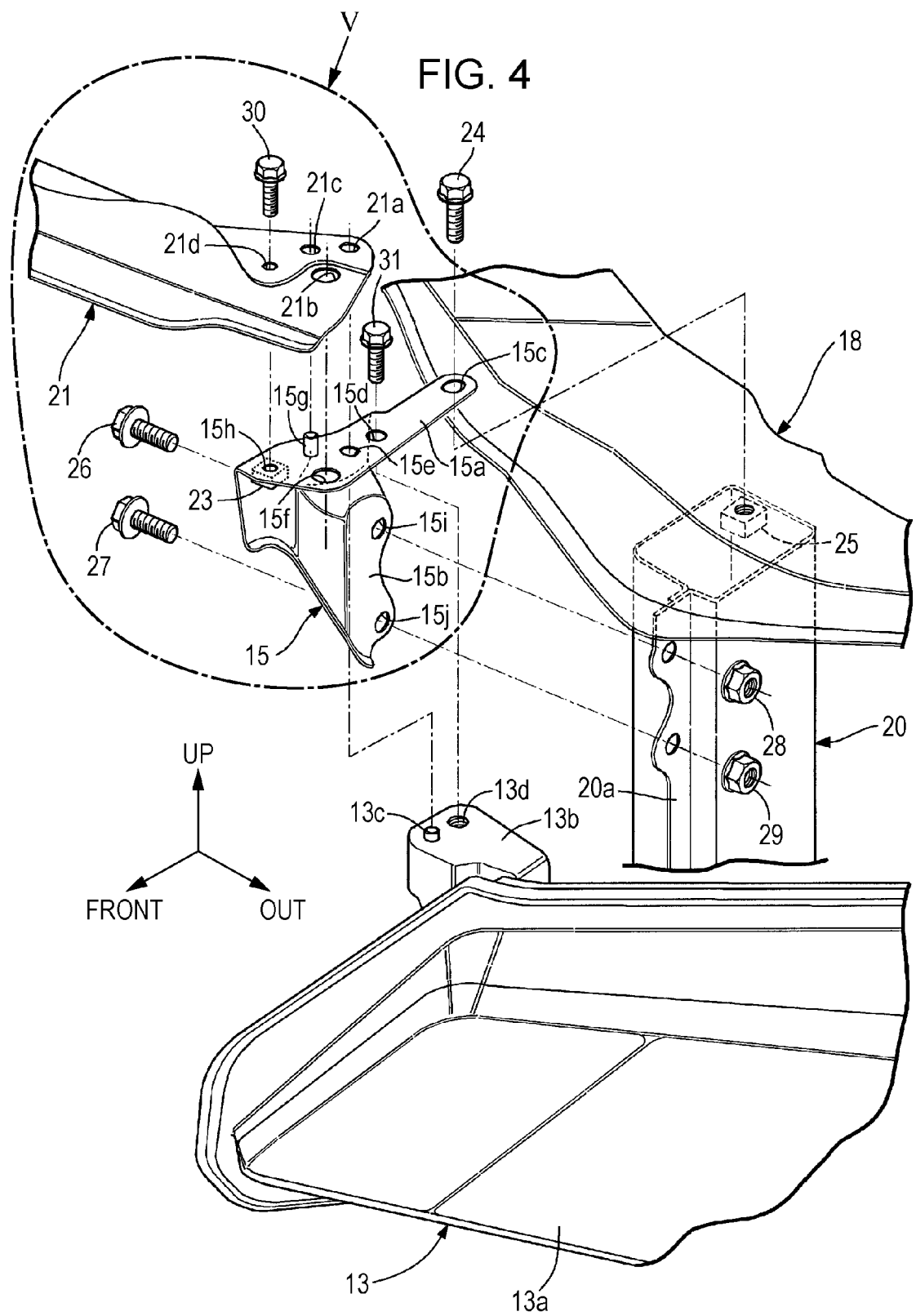
FIG. 4 is an exploded perspective view corresponding to FIG. 3.

Referring to FIGS. 1 and 2, a front bumper face 11 made of synthetic resin is provided on the front of a body of a motor vehicle. The front bumper face 11 includes a front bumper grille 12 integrally provided at the upper center thereof. The front bumper face 11 also has a pair of air-intake openings 11a at the lower right and left, respectively, thereof and a pair of cuts 11b at the upper right and left, respectively, thereof. Transparent lens members 13a included in a pair of headlights 13 are fitted in the cuts 11b, respectively. The front edge of an openable hood 14 covering an engine room faces the upper edge of the front bumper grille 12 and faces inner-side portions, in the body width direction, of the upper edges of the lens members 13a of the right and left headlights 13 with certain gaps provided therebetween.

Three members, specifically, the front bumper grille 12, the hood 14, and the lens member 13a of each of the headlights 13, have corners thereof which are gathered in a corresponding one of parts A encircled by dash-dotted lines in FIG. 1. If the gaps between the three members are not uniform, the beauty of appearance is deteriorated. Therefore, in the process of assembling the body, the three members of the front bumper grille 12, the hood 14, and each headlight 13 need to be positioned accurately so that the gaps produced therebetween become uniform.

In the present embodiment, the three members are positioned with respect to a pair of positioning brackets 15 (see FIG. 2). Specifically, a front bulkhead 17, which is fixed to the front ends of right and left front side frames 16, includes an upper member 18, a lower member 19, and right and left side members 20 that in combination form a quadrilateral frame. The pair of positioning brackets 15 are fixed to individual positions where the right and left ends of the upper member 18 meet the respective right and left side members 20.

In the process of assembling the body, the right and left ends of an upper beam 21, which is to form part of the front bumper grille 12, are positioned at and are fixed to the right and left positioning brackets 15, respectively. Subsequently, the upper edge of the front bumper grille 12 is fixed to the upper beam 21. Thus, the front bumper grille 12 is set to a proper position. The right and left headlights 13 are positioned at and are fixed to the right and left positioning brackets 15, respectively. Thus, the headlights 13 are individually set to proper positions. The front side of the hood 14 is positioned with respect to the right and left positioning brackets 15. In this state, hinge brackets 22 that rotatably support hinge portions 14a, respectively, provided at the rear of the hood 14 are fixed to the body. Thus, the hood 14 is set to a proper position.

A central portion, in the body width direction, of the upper beam 21 forming part of the front bumper grille 12 is connected to the upper member 18 of the front bulkhead 17 with right and left connecting members 33 extending in the anterior-posterior direction. The right and left connecting members 33 are connected to each other with a horn bracket 34 that supports a horn (not illustrated).

Referring to FIGS. 3 to 9, the positioning brackets 15 are each a member obtained through pressing of a piece of metal plate. The positioning bracket 15 includes a flat upper wall portion 15a extending in the H-plane and a flat sidewall portion 15b extending in the B-plane. The upper wall portion 15a has a first fitting hole 15c that is oblong in the anterior-posterior direction, a headlight-fixing hole 15d that is oblong in the body width direction, a headlight-positioning hole 15e that is oblong in the body width direction, a hood-positioning hole 15f that has a round shape, an upper-beam-positioning pin 15g that projects upward, and an upper-beam-fixing hole 15h that is provided with a weld nut 23 welded to the back side thereof. The sidewall portion 15b has a pair of second and third fitting holes 15i and 15j that are spaced apart from each other in the vertical direction.

The positioning bracket 15 is fixed in the H-plane to the upper surface of the upper member 18 of the front bulkhead 17 with a bolt 24 passing through the first fitting hole 15c and a weld nut 25 and is also fixed in the B-plane to a flange 20a included in a corresponding one of the side members 20 of the front bulkhead 17 with two bolts 26 and 27 passing through the second and third fitting holes 15i and 15j, respectively, and two nuts 28 and 29.

The upper beam 21, which extends in the H-plane, has at each end thereof in the body width direction a headlight-positioning hole 21a that is oblong and coincides with the headlight-positioning hole 15e of a corresponding one of the positioning brackets 15, a hood-positioning hole 21b that is round and coincides with the hood-positioning hole 15f of the positioning bracket 15, an upper-beam-positioning hole 21c that is oblong in the body width direction and into which the upper-beam-positioning pin 15g of the positioning bracket 15 is fitted, and an upper-beam-fixing hole 21d that is round and coincides with the upper-beam-fixing hole 15h of the positioning bracket 15.

The upper beam 21 is positioned by fitting the upper-beam-positioning hole 21c onto the upper-beam-positioning pin 15g of the positioning bracket 15. In this state, a bolt 30 is inserted into the upper-beam-fixing hole 21d and is screwed into the weld nut 23. Thus, the upper beam 21 is fixed to the positioning bracket 15. In this state, the headlight-positioning hole 21a and the hood-positioning hole 21b of the upper beam 21 coincide with the headlight-positioning hole 15e and the hood-positioning hole 15f, respectively, of the positioning bracket 15.

Each headlight 13 has a fitting bracket 13b projecting from the back thereof and provided on the inner side thereof in the body width direction. The upper surface of the fitting bracket 13b extends in the H-plane and has a headlight-positioning pin 13c and a bolt hole 13d. The headlight 13 is positioned by fitting the headlight-positioning pin 13c into the headlight-positioning hole 15e of the positioning bracket 15 and the headlight-positioning hole 21a of the upper beam 21 from the lower side toward the upper side. In this state, a bolt 31 is inserted into the headlight-fixing hole 15d of the positioning bracket 15 from the upper side toward the lower side and is screwed into the bolt hole 13d of the fitting bracket 13b. Thus, the headlight 13 is fixed to the positioning bracket 15.

Figure 10:
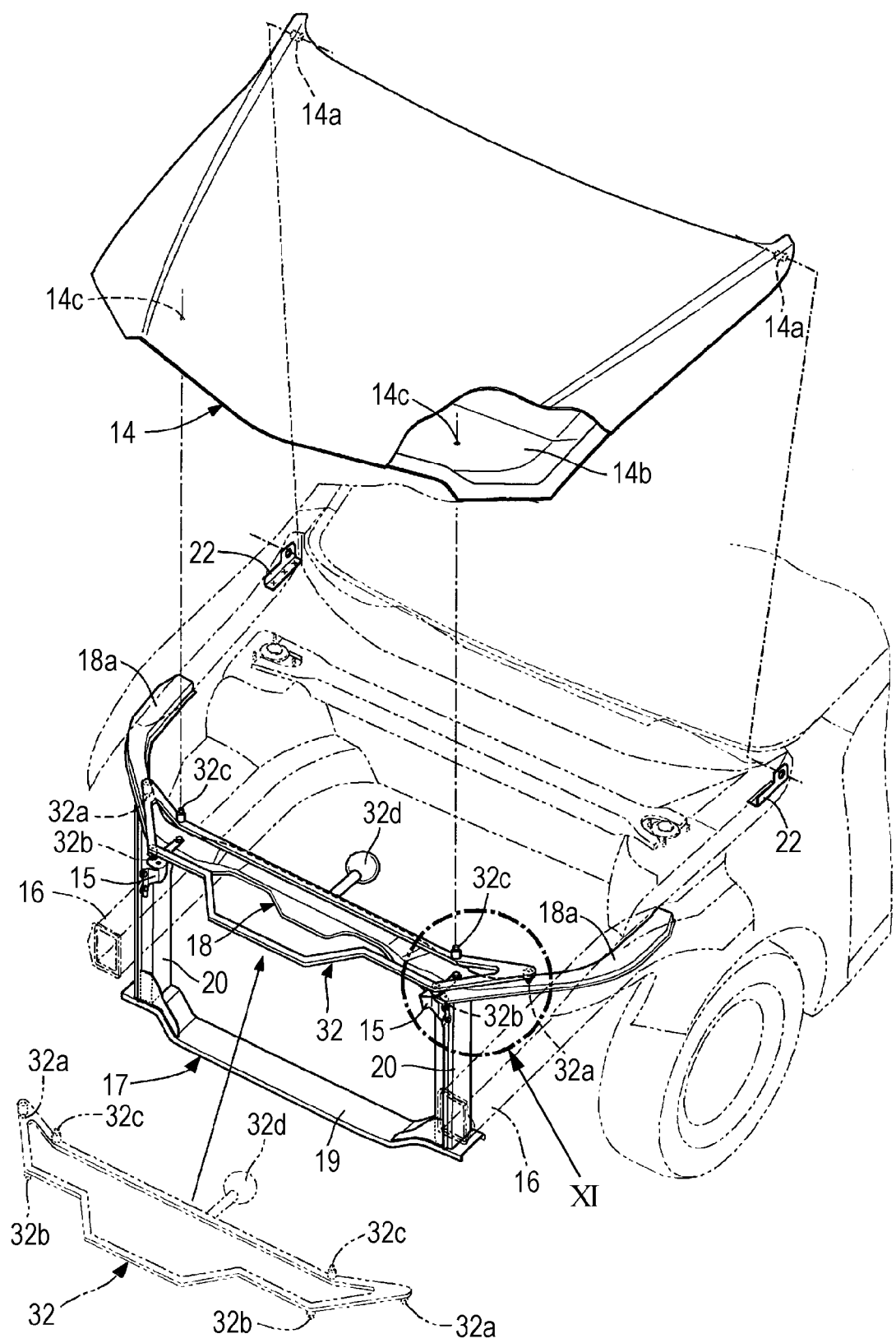
FIG. 10 illustrates a state where a positioning jig has been attached to a bulkhead.
Figure 11:
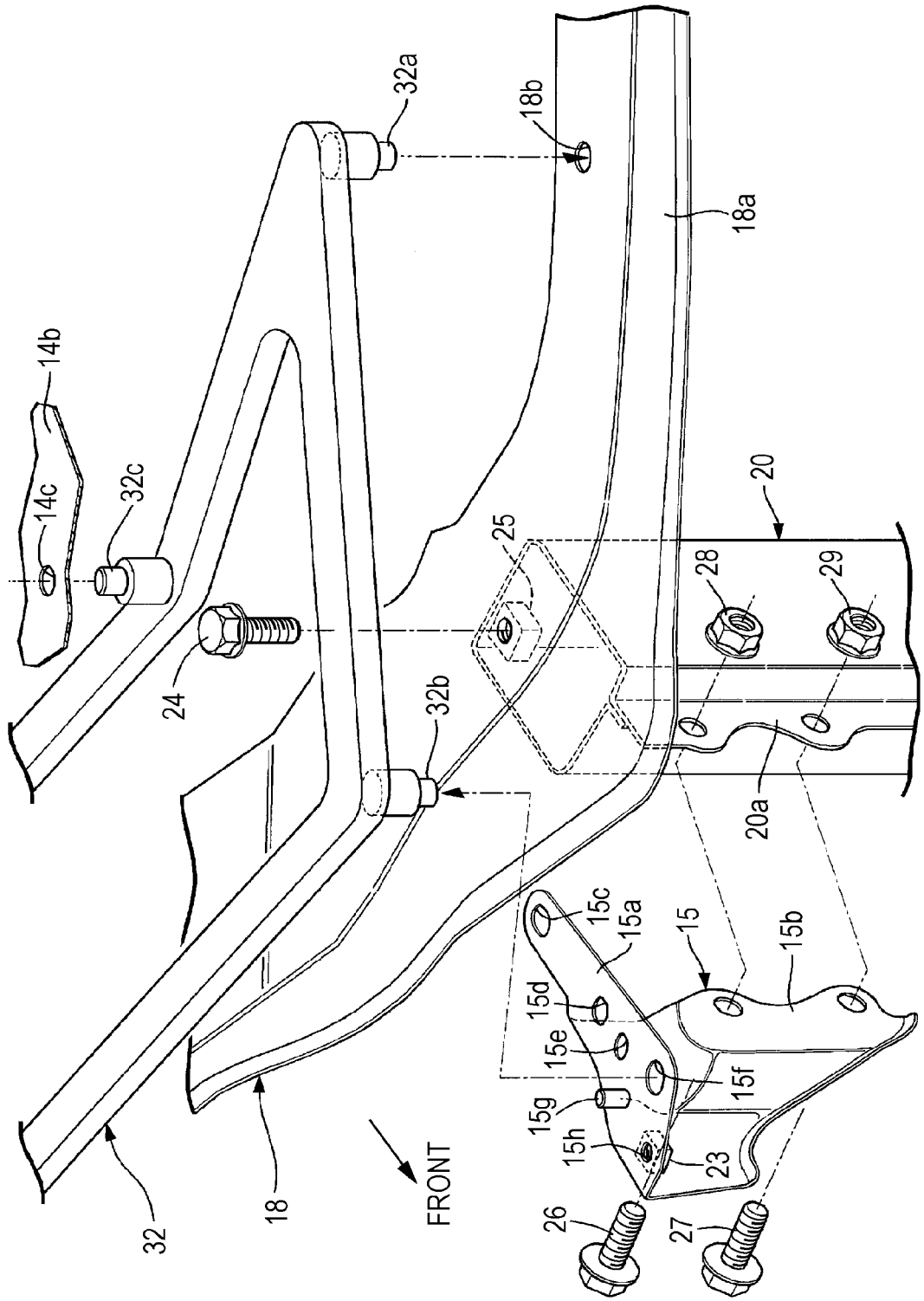
FIG. 11 is an enlarged view of part XI illustrated in FIG. 10.

Referring to FIGS. 10 and 11, a positioning jig 32 has a flat frame-like shape and extends in the H-plane. The positioning jig 32 has a pair of right and left first positioning pins 32a projecting downward from the right and left ends, respectively, thereof, a pair of right and left second positioning pins 32b projecting downward from individual positions thereof on the inner side in the body width direction and on the front side with respect to the first positioning pins 32a, a pair of right and left third positioning pins 32c projecting upward from individual positions thereof on the inner side in the body width direction with respect to the first positioning pins 32a, and a counterweight 32d projecting rearward from a central portion thereof in the body width direction.

The upper member 18 of the front bulkhead 17 includes upper-member extensions 18a extending from the right and left ends, respectively, thereof toward the outer side in the body width direction and toward the rear. The upper-member extensions 18a have jig-positioning holes 18b, respectively, provided in the upper surfaces thereof. The first positioning pins 32a of the positioning jig 32 are fitted into the jig-positioning holes 18b, respectively, whereby the positioning jig 32 is positioned with respect to the front bulkhead 17. In this state, the positioning jig 32 tends to turn downward on the front side thereof about the first positioning pins 32a under a gravitational force. Meanwhile, the counterweight 32d produces a moment acting in such a manner as to lift the front side of the positioning jig 32. Therefore, the orientation of the positioning jig 32 is stabilized.

Operational effects produced by the above embodiment of the present application will now be described.

Referring to FIGS. 10 and 11, before mounting the front bumper face 11, the headlights 13, and the hood 14 onto the body, the pair of first positioning pins 32a of the positioning jig 32 are fitted into the jig-positioning holes 18b, respectively, of the right and left upper-member extensions 18a of the front bulkhead 17 from the upper side toward the lower side. Thus, the positioning jig 32 is positioned with respect to the body. In this process, the presence of the counterweight 32d included in the positioning jig 32 prevents the positioning jig 32 from tilting downward on the front side thereof and facilitates assembly work.

Subsequently, a pair of positioning holes 14c provided at the front right and the front left, respectively, of a stiffener 14b provided on the underside of the hood 14 are fitted onto the pair of third positioning pins 32c, respectively, of the positioning jig 32 from the upper side toward the lower side. Thus, the front side of the hood 14 is positioned with respect to the positioning jig 32. Then, the hood-positioning holes 15f provided in the upper wall portions 15a of the right and left positioning brackets 15, which have been temporarily fastened to the front bulkhead 17, are fitted onto the pair of second positioning pins 32b, respectively, of the positioning jig 32 from the lower side toward the upper side. Thus, the positioning brackets 15 are positioned with respect to the positioning jig 32.

Subsequently, on each of the right and left sides, the three bolts 24, 26, and 27 are fastened with the weld nut 25 and the nuts 28 and 29, respectively. Thus, the positioning brackets 15 are properly fastened to the front bulkhead 17. Meanwhile, the right and left hinge brackets 22 that rotatably support the hinge portions 14a, respectively, provided at the rear of the hood 14 are fastened to the body. Thus, the hood 14 is mounted onto the body. In this process, any positional shifts of the positioning brackets 15 in the anterior-posterior direction are effectively absorbed by the first fitting holes 15c, respectively, of the positioning brackets 15 that are oblong in the anterior-posterior direction. Therefore, the positioning brackets 15 are positioned accurately.

In this manner, the right and left positioning brackets 15 are mounted onto the body while being properly positioned with respect to the front bulkhead 17 with the aid of the positioning jig 32, and the hood 14 is mounted onto the body while being indirectly positioned with respect to the positioning brackets 15 with the aid of the positioning jig 32. That is, the hood 14 is mounted onto the body while being properly positioned with the aid of the positioning brackets 15.

Subsequently, the fitting brackets 13b of the right and left headlights 13 are made to advance toward the positioning brackets 15, respectively, from the front side toward the rear side. Then, the headlight-positioning pins 13c of the fitting brackets 13b are fitted into the headlight-positioning holes 15e, respectively, of the positioning brackets 15 and the headlight-positioning holes 21a, respectively, of the upper beam 21 from the lower side toward the upper side. Thus, the headlights 13 are positioned.

In this process, since the positioning brackets 15 have channels 15k (see FIG. 9), respectively, extending in the anterior-posterior direction and the fitting brackets 13b are made to advance along the channels 15k, respectively, the interference between the fitting brackets 13b and the positioning brackets 15 is prevented. Furthermore, the headlight-positioning holes 15e of the positioning brackets 15 and the headlight-positioning holes 21a of the upper beam 21 are oblong in the body width direction and therefore effectively absorb any positional shifts of the headlights 13 in the body width direction. Hence, the headlights 13 are positioned accurately.

Subsequently, the bolts 31 are inserted into the headlight-fixing holes 15d, respectively, of the positioning brackets 15 from the upper side toward the lower side and are screwed into the bolt holes 13d, respectively, provided in the fitting brackets 13b of the headlights 13. Thus, the headlights 13 are fixed to the respective positioning brackets 15. In this process, the headlight-fixing holes 15d of the positioning brackets 15 that are oblong in the body width direction absorb any positional errors of the headlights 13 in the body width direction. Hence, the positioning of the headlights 13 is performed efficiently.

The headlights 13 are fixed not only to the positioning brackets 15 at the fitting brackets 13b thereof but also to the body at a plurality of fixing portions (not illustrated) thereof provided on the outer side in the body width direction with respect to the positioning brackets 15.

Subsequently, the upper-beam-positioning holes 21c of the upper beam 21 are fitted onto the upper-beam-positioning pins 15g, respectively, of the positioning brackets 15 from the upper side toward the lower side. Thus, the upper beam 21 is positioned. In this state, the bolts 30 are inserted into the upper-beam-fixing holes 21d, respectively, of the upper beam 21 and the upper-beam-fixing holes 15h, respectively, of the positioning brackets 15 from the upper side toward the lower side and are screwed into the respective weld nuts 23. Thus, the upper beam 21 having been positioned with respect to the positioning brackets 15 is fixed to the positioning brackets 15. Furthermore, the front bumper grille 12 of the front bumper face 11 is fixed to the upper beam 21. Thus, the front bumper grille 12 is set to a proper position with respect to the positioning brackets 15.

In this process, the upper-beam-positioning holes 21c of the upper beam 21 that are oblong in the body width direction effectively absorb any positional shift of the upper beam 21 in the body width direction. Hence, the upper beam 21 is positioned accurately.

To summarize, the positioning brackets 15 each including the hood-positioning hole 15f, the headlight-positioning hole 15e, and the upper-beam-positioning pin 15g are positioned with respect to and are fixed to the front bulkhead 17. Furthermore, the hood 14, each of the headlights 13, and the upper beam 21 (i.e., the front bumper grille 12) are positioned with respect to the hood-positioning hole 15f, the headlight-positioning hole 15e, and the upper-beam-positioning pin 15g, respectively, and are mounted on the body. Therefore, the size of the gaps produced at the parts where the hood 14, the headlights 13, and the front bumper grille 12 meet (parts A illustrated in FIG. 1) are controlled accurately. Consequently, the beauty of appearance is improved.

Figure 5:
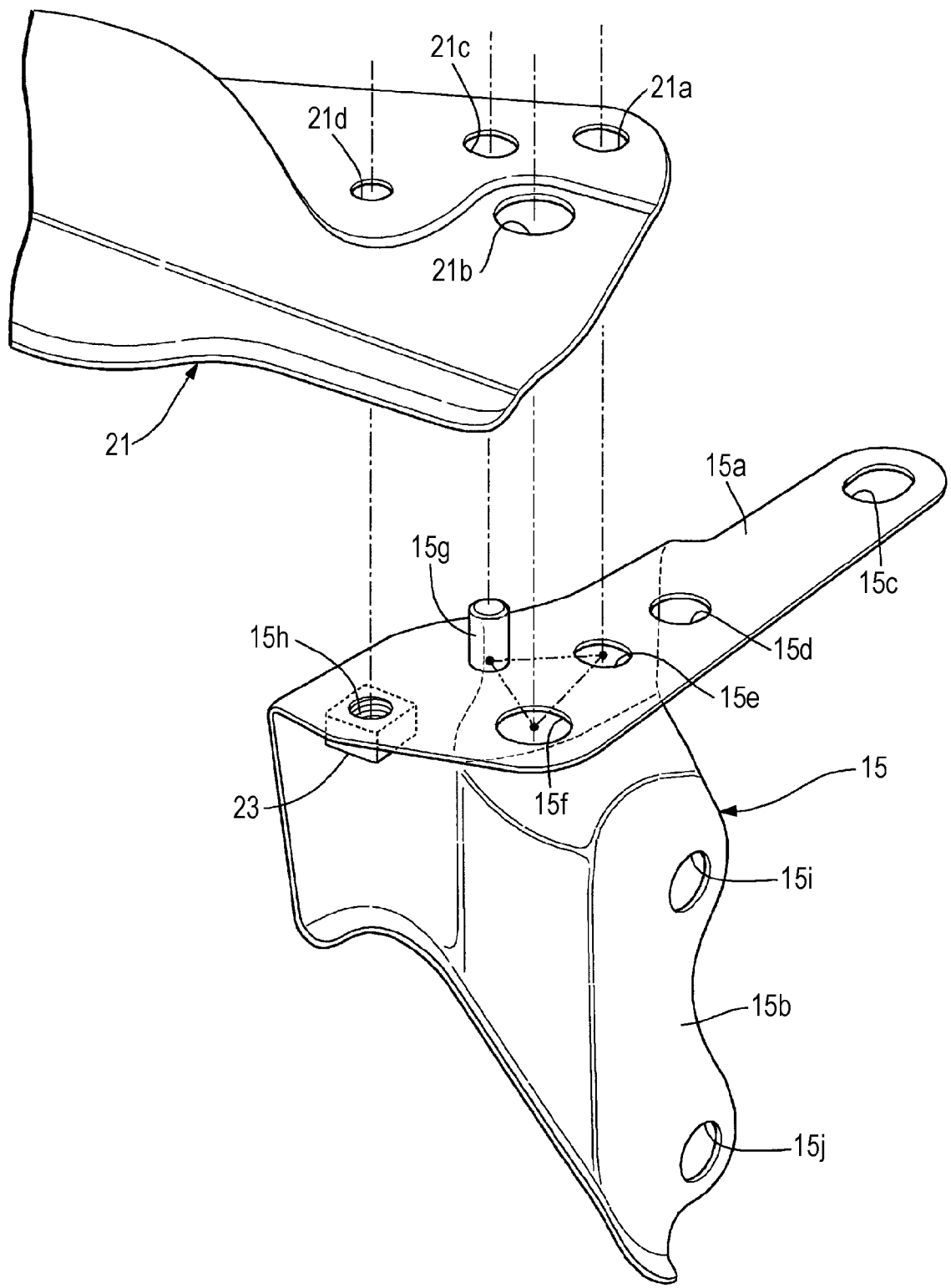
FIG. 5 is an enlarged view of relevant members in part V illustrated in FIG. 4.
Figure 6:
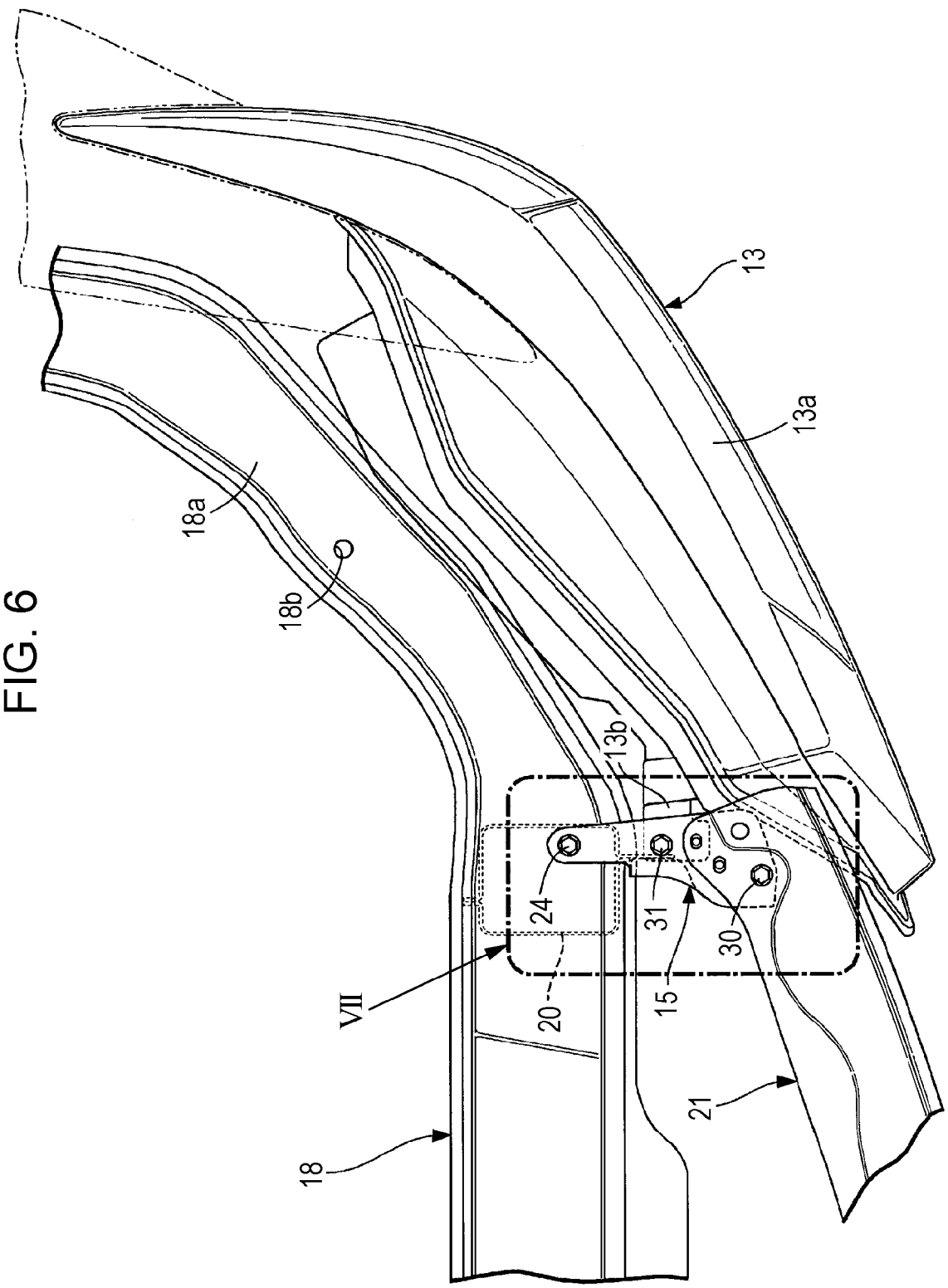
FIG. 6 is a plan view on arrow VI illustrated in FIG. 3.
Figure 7:
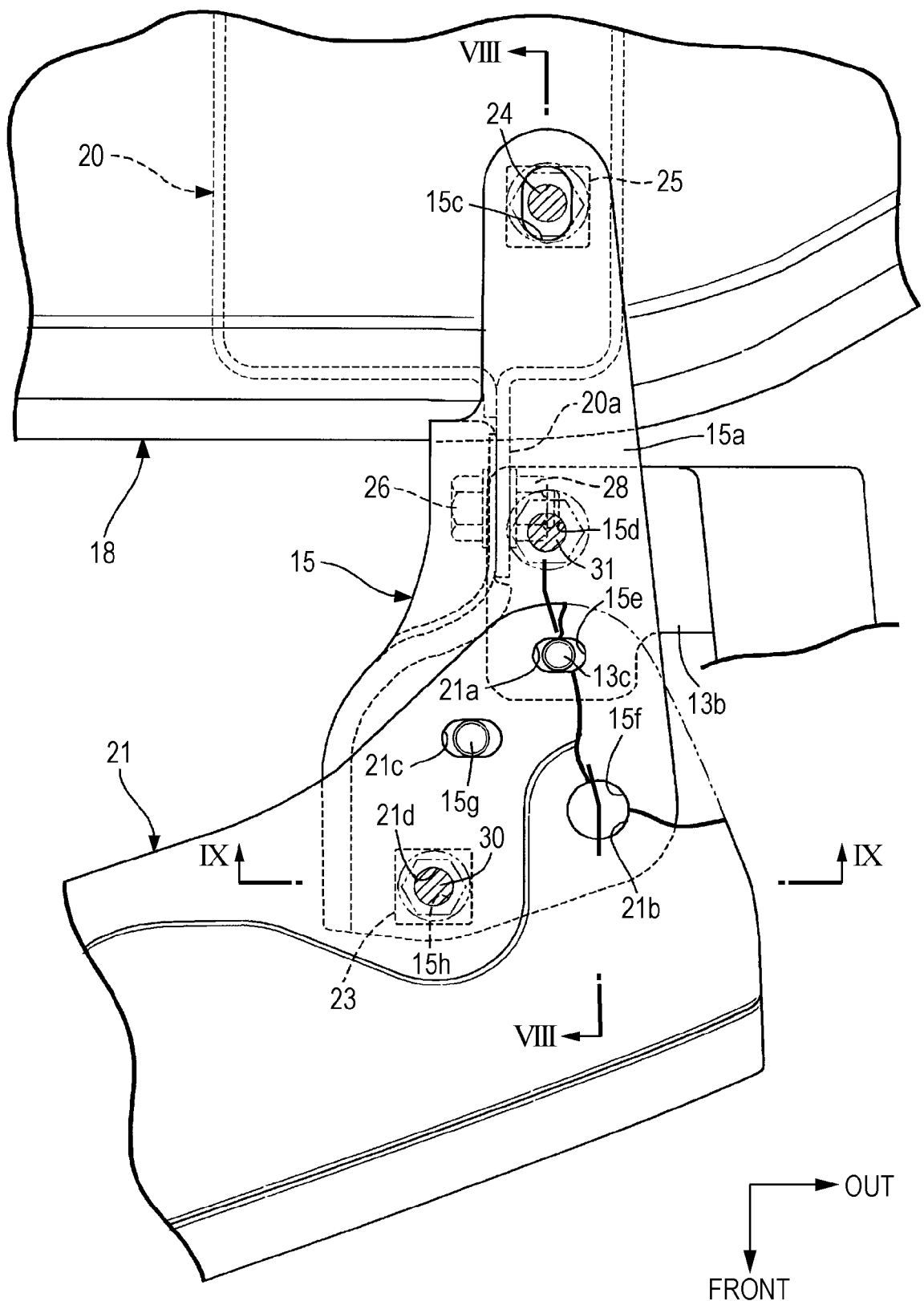
FIG. 7 is an enlarged view of part VII illustrated in FIG. 6.
Figure 8:
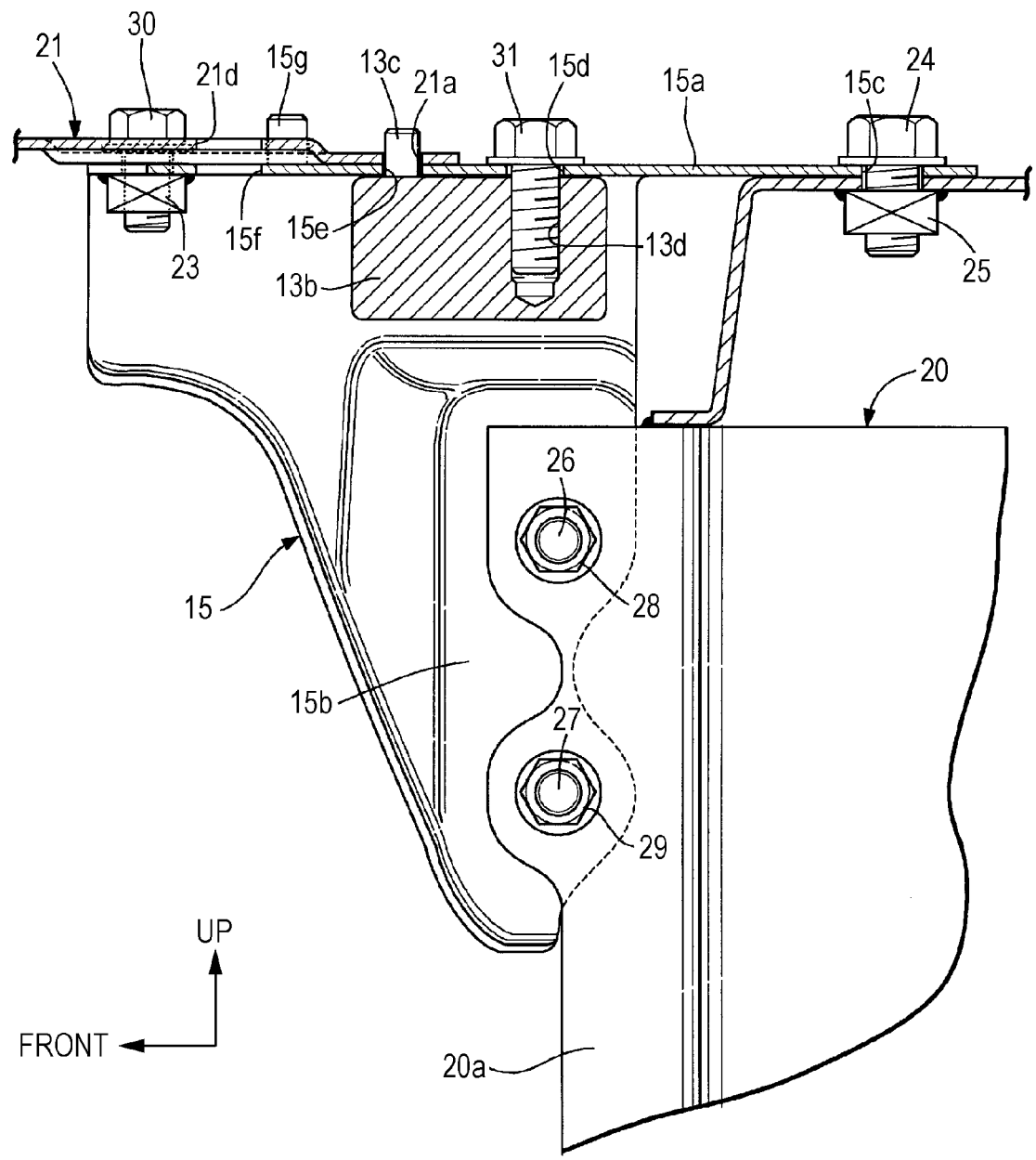
FIG. 8 is a sectional view taken along line VIII-VIII illustrated in FIG. 7.
Figure 9:
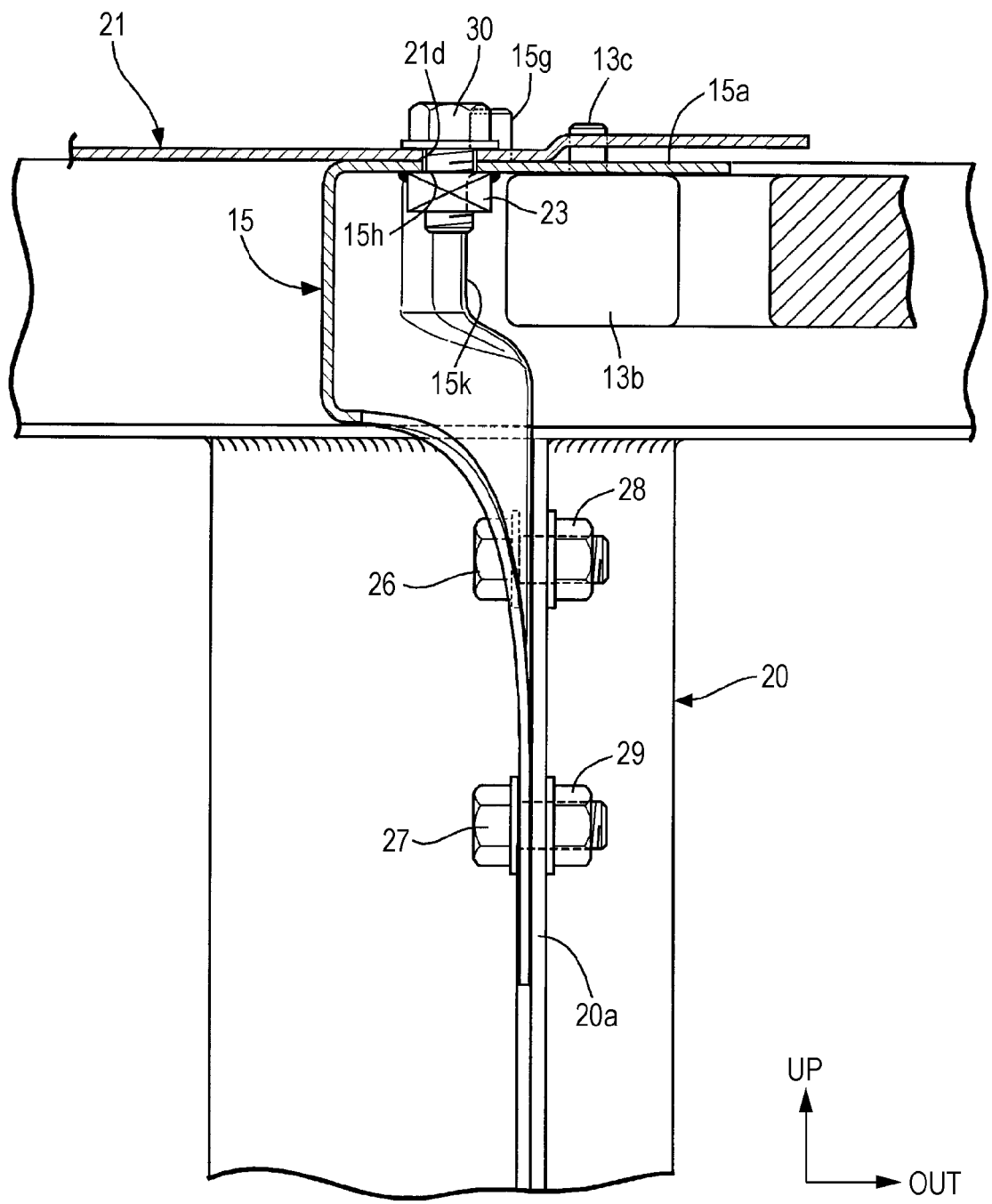
FIG. 9 is a sectional view taken along line IX-IX illustrated in FIG. 7.

In the above configuration, the hood-positioning hole 15f, the headlight-positioning hole 15e, and the upper-beam-positioning pin 15g of each of the positioning brackets 15 are arranged in such a manner as to form a virtual triangle (as represented by the dash-dotted lines in FIG. 5). Therefore, the size of the gaps produced between the hood 14, the headlights 13, and the front bumper grille 12 are controlled more accurately. Consequently, the beauty of appearance is further improved.

Furthermore, the positioning brackets 15 each include the headlight-fixing hole 15d at a position adjacent to the headlight-positioning hole 15e. Therefore, each of the headlights 13 is fixed to a corresponding one of the positioning brackets 15 while a sufficient level of accuracy in positioning the headlight 13 with the aid of the headlight-positioning hole 15e is maintained. In addition, the positioning brackets 15 each include the upper-beam-fixing hole 15h at a position adjacent to the upper-beam-positioning pin 15g. Therefore, the upper beam 21 is fixed to the positioning brackets 15 while a sufficient level of accuracy in positioning the upper beam 21 (i.e., the front bumper grille 12) is maintained.

Furthermore, the pair of right and left positioning brackets 15 are each fastened to a corresponding one of the right and left side members 20 included in the front bulkhead 17 with the two bolts 26 and 27 provided on the upper and lower sides. Furthermore, the two ends, in the body width direction, of the upper beam 21 included in the front bumper grille 12 are positioned with respect to and are fixed to the pair of right and left positioning brackets 15, respectively. Therefore, the weight of the front bumper grille 12 is assuredly transmitted to the right and left side members 20 of the front bulkhead 17 via the pair of right and left positioning brackets 15. Thus, the right and left ends of the front bumper grille 12 are prevented from bending downward under a gravitational force.

Furthermore, the upper beam 21 of the front bumper grille 12 and the upper member 18 of the front bulkhead 17 are connected to each other in the body anterior-posterior direction with the pair of right and left connecting members 33, and the pair of right and left connecting members 33 are connected to each other in the body width direction with the horn bracket 34. Therefore, the upper beam 21 is reinforced with the connecting members 33 and the horn bracket 34. Thus, the strength of the front bumper grille 12 supported by the front bulkhead 17 is increased.

While an embodiment of the present application has been described above, various design changes can be made thereto without departing from the scope of the present application.

An exemplary design change is as follows. In the above embodiment, the hood 14 is indirectly positioned with respect to the positioning brackets 15 with the aid of the positioning jig 32. Alternatively, the hood 14 may have positioning pins that are to be fitted into the hood-positioning holes 15f, respectively, of the positioning brackets 15, so that the hood 14 may be directly positioned with respect to the positioning brackets 15.

I claim:

1. A vehicle body front structure including at least a hood, a headlight, and a front bumper each mounted on a front portion of a body of a vehicle, the structure comprising:
    a front bulkhead; and
    a positioning bracket fixed to the front bulkhead and including a hood-mounting reference, a headlight-mounting reference, and a front-bumper-mounting reference,
    wherein the hood, the headlight, and the front bumper are positioned for fixing with respect to the hood-mounting reference, the headlight-mounting reference, and the front-bumper-mounting reference, respectively,
    wherein the hood-mounting reference, the headlight-mounting reference, and the front-bumper-mounting reference are arranged to form a virtual triangle defined on the positioning bracket, and
    wherein the hood-mounting reference, the headlight-mounting reference, and the front-bumper-mounting reference are disposed on the same plane.

2. The vehicle body front structure according to claim 1, wherein the positioning bracket further includes:
    a headlight-fastening portion at a position adjacent to the headlight-mounting reference; and
    a front-bumper-fastening portion at a position adjacent to the front-bumper-mounting reference.

3. A vehicle body front structure including at least a hood, headlights, and a front bumper each mounted on a front portion of a body of a vehicle, the structure comprising:
    a front bulkhead; and
    a pair of right and left positioning brackets fixed to the front bulkhead and each including a hood-mounting reference, a headlight-mounting reference, and a front-bumper-mounting reference, wherein the hood, each of the headlights, and the front bumper are positioned for fixing with respect to the hood-mounting reference, the headlight-mounting reference, and the front-bumper-mounting reference, respectively, wherein the front bulkhead includes right and left side members, wherein the right and left positioning brackets are each fixed at an upper portion and a lower portion thereof to the right and left side members, respectively, wherein the front bumper includes an upper beam, respective ends of the upper beam in a body width direction being positioned with respect to the front-bumper-mounting reference and being fastened at the front-bumper-fastening portion, wherein the front bulkhead includes an upper member, and wherein the structure further comprising:

a pair of right and left connecting members connecting the upper beam and the upper member to each other in a body anterior-posterior direction; and a horn bracket connecting the pair of right and left connecting members to each other in the body width direction.

4. The vehicle body front structure according to claim 1, wherein the hood-mounting reference, the headlight-mounting reference, and the front-bumper-mounting reference include an engaging structure, respectively, the engaging structure being physically engageable with other member.

5. The vehicle body front structure according to claim 2, wherein the headlight-fastening portion and the headlight-mounting reference are disposed on the same plane, and wherein the front-bumper-fastening portion and the front-bumper-mounting reference are disposed on the same plane.

6. The vehicle body front structure according to claim 1, wherein the positioning bracket includes a side wall and an upper wall, and wherein the hood-mounting reference, the headlight-mounting reference, and the front-bumper-mounting reference are disposed on the upper wall.

7. The vehicle body front structure according to claim 5, wherein the positioning bracket includes a side wall and an upper wall, wherein the headlight-fastening portion and the headlight-mounting reference are disposed on the upper wall, and wherein the front-bumper-fastening portion and the front-bumper-mounting reference are disposed on the upper wall.

8. A vehicle body front structure including at least a hood, a headlight, and a front bumper each mounted on a front portion of a body of a vehicle, the structure comprising:

a front bulkhead; and a positioning bracket fixed to the front bulkhead and including a hood-mounting reference, a headlight-mounting reference, and a front-bumper-mounting reference, wherein the hood, the headlight, and the front bumper are positioned for fixing with respect to the hood-mounting reference, the headlight-mounting reference, and the front-bumper-mounting reference, respectively, wherein the positioning bracket further includes:

a headlight-fastening portion at a position adjacent to the headlight-mounting reference; and a front-bumper-fastening portion at a position adjacent to the front-bumper-mounting reference, wherein the headlight-fastening portion and the headlight-mounting reference are disposed on the same plane, wherein the front-bumper-fastening portion and the front-bumper-mounting reference are disposed on the same plane, wherein the positioning bracket includes a side wall and an upper wall, wherein the headlight-fastening portion and the headlight-mounting reference are disposed on the upper wall, and wherein the front-bumper-fastening portion and the front-bumper-mounting reference are disposed on the upper wall.

* * * * *